US012035122B2

(12) United States Patent
Ohtake et al.

(10) Patent No.: US 12,035,122 B2
(45) Date of Patent: Jul. 9, 2024

(54) SPEAKER SYSTEM AND SOUND OUTPUT METHOD

(71) Applicant: Yamaha Corporation, Shizuoka (JP)

(72) Inventors: Kohei Ohtake, Shizuoka (JP); Miyu Miyazaki, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 216 days.

(21) Appl. No.: 17/874,087

(22) Filed: Jul. 26, 2022

(65) Prior Publication Data

US 2023/0035692 A1    Feb. 2, 2023

(30) Foreign Application Priority Data

Jul. 27, 2021 (JP) .................. 2021-122168

(51) Int. Cl.
| | |
|---|---|
| *H04S 7/00* | (2006.01) |
| *G10K 11/34* | (2006.01) |
| *G10K 11/35* | (2006.01) |
| *H04R 1/32* | (2006.01) |
| *H04R 3/12* | (2006.01) |
| *B64C 39/02* | (2023.01) |
| *B64U 101/00* | (2023.01) |

(52) U.S. Cl.
CPC .............. *H04S 7/30* (2013.01); *G10K 11/341* (2013.01); *G10K 11/352* (2013.01); *H04R 1/323* (2013.01); *H04R 3/12* (2013.01); *B64C 39/024* (2013.01); *B64U 2101/00* (2023.01); *H04R 2420/07* (2013.01); *H04R 2430/23* (2013.01)

(58) Field of Classification Search
CPC ....... H04S 7/30; H04S 2400/11; H04R 1/323; H04R 3/12; H04R 2420/07; H04R 2430/23; B64C 39/024; B64U 2101/00; B64U 2101/20; B64U 2101/70; G10K 11/341; G10K 11/352
See application file for complete search history.

(56) References Cited

U.S. PATENT DOCUMENTS

| | | | | |
|---|---|---|---|---|
| 2015/0092944 | A1* | 4/2015 | Someda | .................. H04S 7/302 381/1 |
| 2017/0337581 | A1 | 11/2017 | Nozawa | |
| 2019/0297438 | A1 | 9/2019 | Miyawaki | |
| 2020/0118337 | A1* | 4/2020 | Yeung | ..................... G06T 7/337 |

FOREIGN PATENT DOCUMENTS

| | | | |
|---|---|---|---|
| JP | 6080143 | B1 | 2/2017 |
| JP | 6624747 | B2 | 12/2019 |

* cited by examiner

*Primary Examiner* — Tuan D Nguyen
(74) *Attorney, Agent, or Firm* — Global IP Counselors, LLP

(57) ABSTRACT

A speaker system includes a first speaker and a second speaker. The first speaker includes a first sound signal input interface configured to acquire a first sound signal, and a first sound emitter configured to output a first sound based on the first sound signal in a state in which a position of a host device is fixed. The second speaker includes a second sound signal input interface configured to acquire a second sound signal, a moving body that includes a position information acquisition interface configured to acquire information relating to position and that is configured to move based on the information relating to position, and a second sound emitter configured to output a second sound based on the second sound signal.

18 Claims, 9 Drawing Sheets

SPEAKER SYSTEM AND SOUND OUTPUT METHOD

CROSS-REFERENCE TO RELATED APPLICATIONS

This application claims priority to Japanese Patent Application No. 2021-122168, filed on Jul. 27, 2021. The entire disclosure of Japanese Patent Application No. 2021-122168 is hereby incorporated herein by reference.

BACKGROUND

Technical Field

One embodiment of the present invention relates to a system and a method for outputting sound from a plurality of speakers.

Background Information

Conventionally, there have been unmanned aerial vehicles that broadcast guidance voice from a speaker and that move in accordance with in-store flight route data (for example, refer to Japanese Patent No. 6080143). Further, there have been unmanned aerial vehicles provided with a speaker and that output voice messages downloaded from a server (for example, refer to Japanese Patent No. 6624747).

SUMMARY

The unmanned aerial vehicles disclosed in Japanese Patent No. 6080143 and Japanese Patent No. 6624747 are not intended to impart a sense of presence to the listener of the content.

Thus, an object of one embodiment of this disclosure is to provide a speaker system that can impart a sense of presence to the listener.

A speaker system according to one embodiment of this disclosure comprises a first speaker and a second speaker. The first speaker includes a first sound signal input interface configured to acquire a first sound signal, and a first sound emitter configured to output a first sound based on the first sound signal in a state in which a position of a host device is fixed. The second speaker includes a second sound signal input interface configured to acquire a second sound signal, a moving body that includes a position information acquisition interface configured to acquire information relating to position and that is configured to move based on the information relating to position, and a second sound emitter configured to output a second sound based on the second sound signal.

DETAILED DESCRIPTION OF TH EMBODIMENTS

Selected embodiments will now be explained with reference to the drawings. It will be apparent to those skilled in the field from this disclosure that the following descriptions of the embodiments are provided for illustration only and not for the purpose of limiting the invention as defined by the appended claims and their equivalents.

First Embodiment

Figure 1:
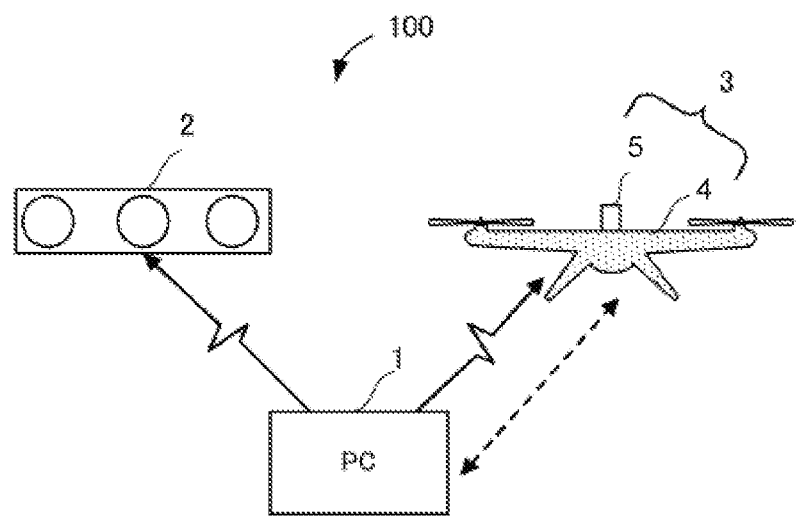
FIG. 1 is a configuration diagram showing one example of the configuration of a speaker system.
Figure 2:
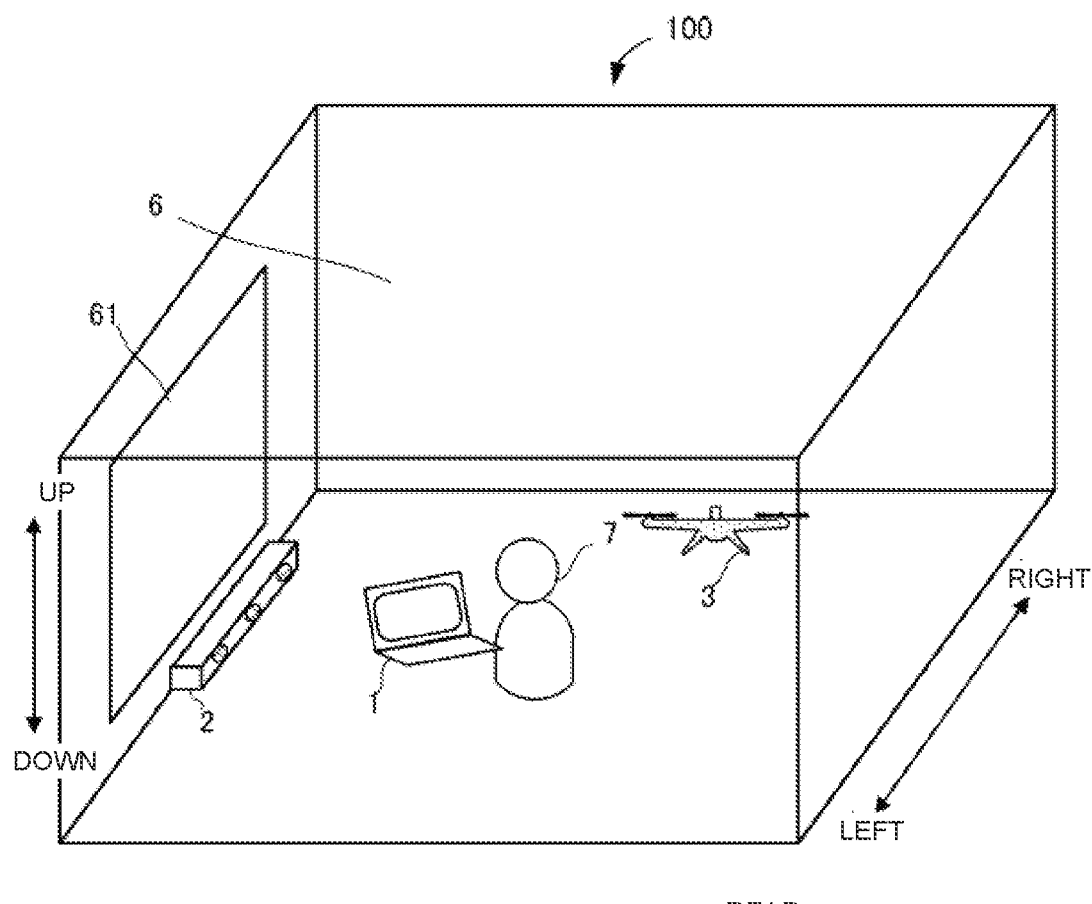
FIG. 2 is an explanatory diagram showing one example of the space M which the speaker system is used.
Figure 3:
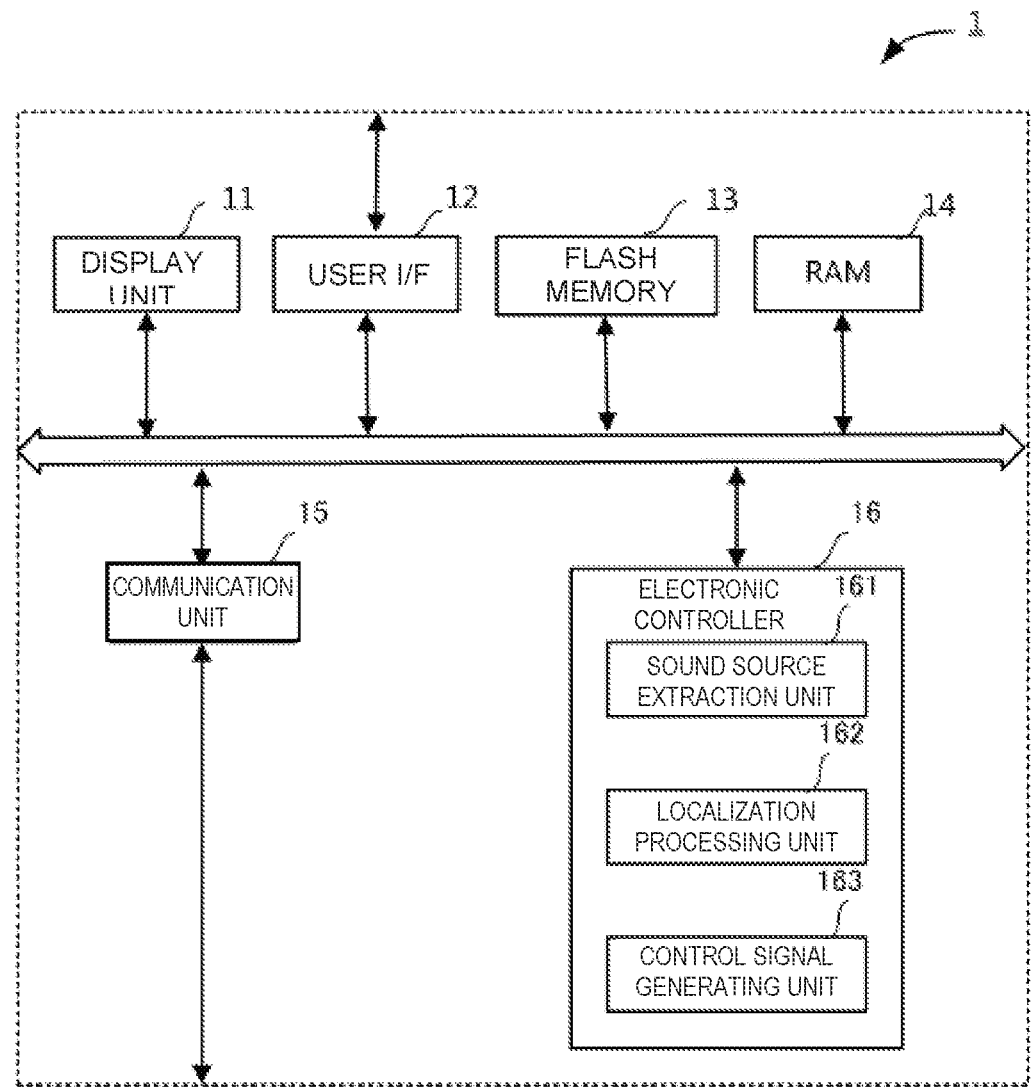
FIG. 3 is a block configuration diagram showing one example of the configuration of a PC.
Figure 4:
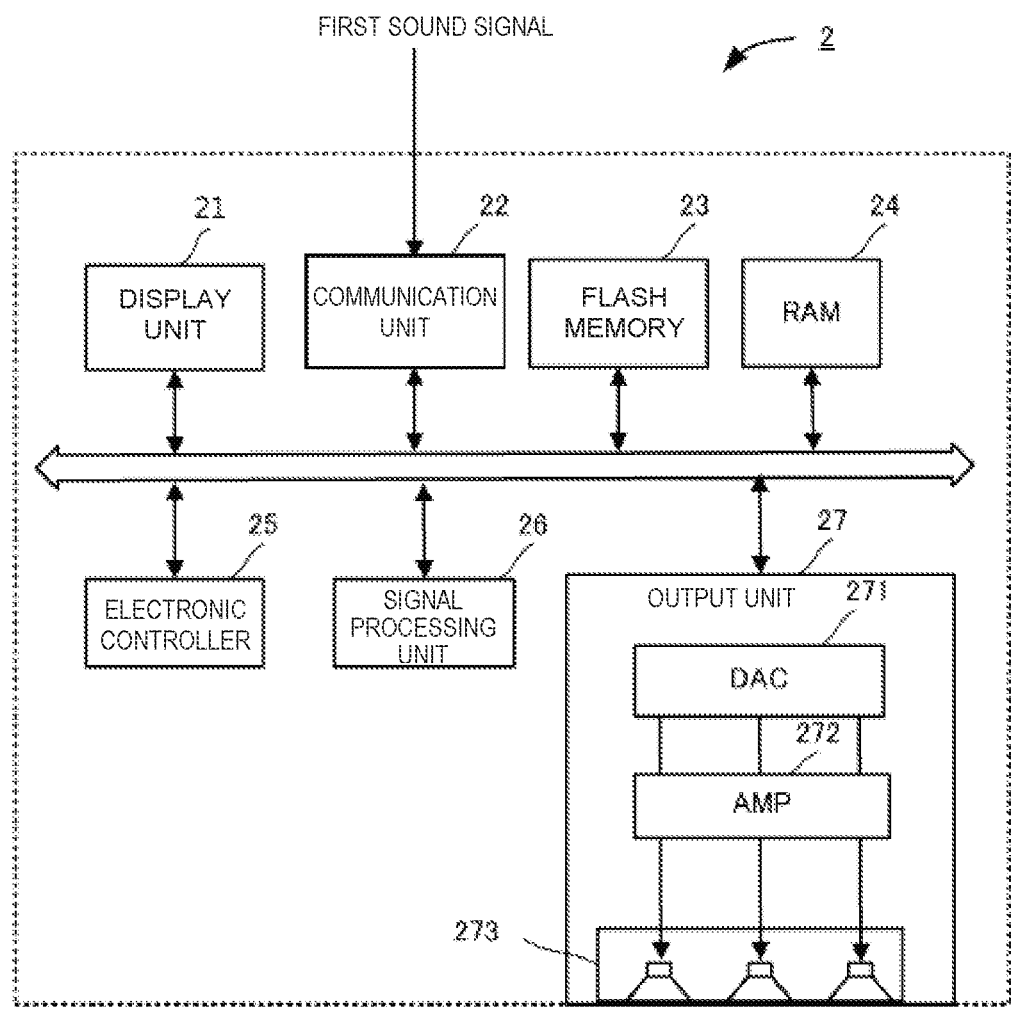
FIG. 4 is a block configuration diagram showing one example of the configuration of a first speaker.
Figure 5:
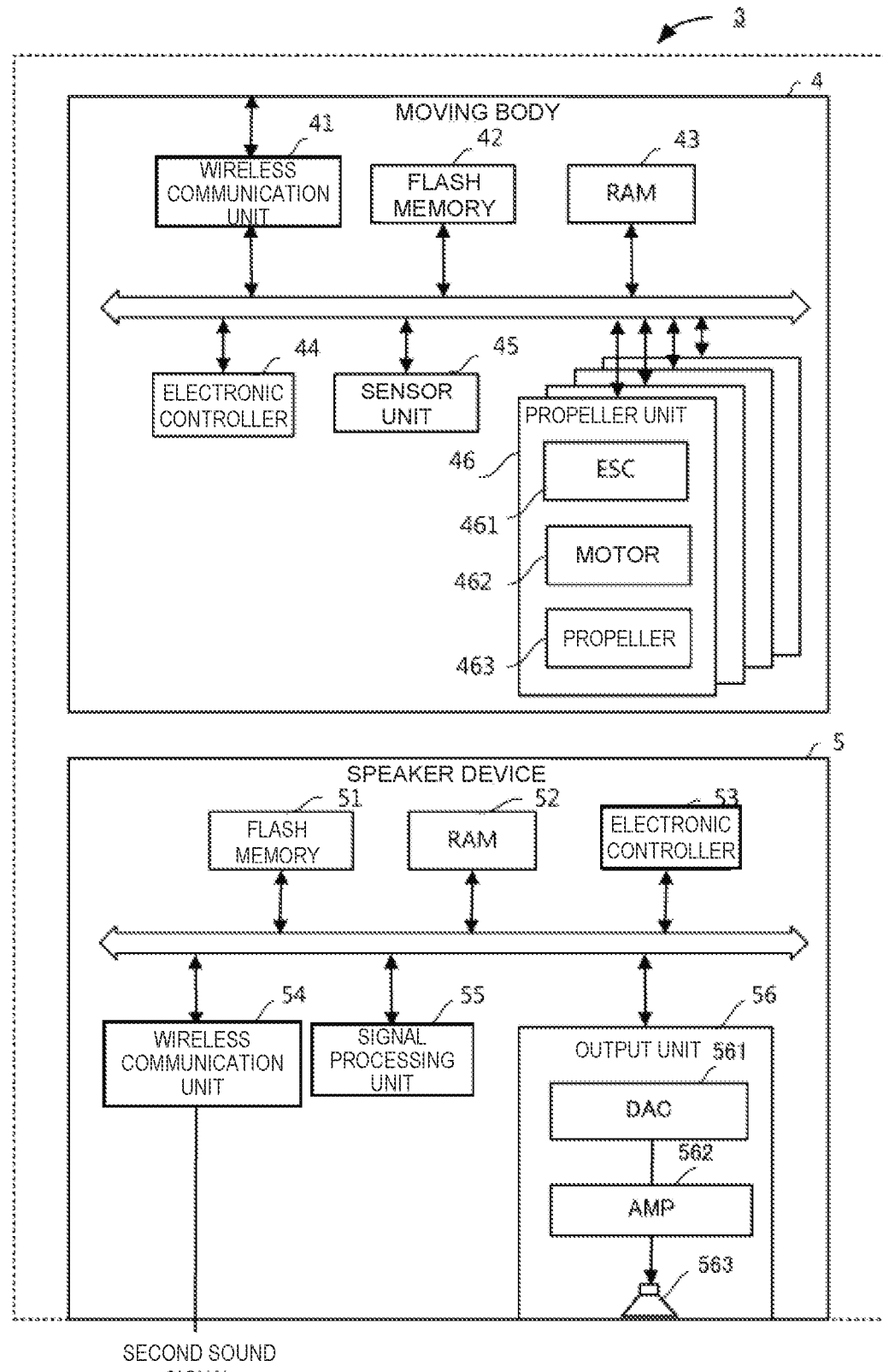
FIG. 5 is a block configuration diagram showing one example of the configuration of a second speaker.

A speaker system 100 according to a first embodiment will be described with reference to the drawings. FIG. 1 is a configuration diagram showing one example of the configuration of the speaker system 100. FIG. 2 is an explanatory diagram showing one example of a space 6 in which the speaker system 100 is used. FIG. 3 is a block configuration diagram showing one example of the configuration of a PC 1. FIG. 4 is a block configuration diagram showing one example of the configuration of a first speaker 2. FIG. 5 is a block configuration diagram showing one example of the configuration of a second speaker 3.

As shown in FIG. 2, the speaker system 100 according to the first embodiment is used in the space 6, for example. The space 6 is, for example, a living room, an amusement building, a live venue, or the like. The speaker system 100 reproduces content selected by a user 7. In the present embodiment, the content is video content, for example. The content can include video and audio. Playback with the speaker system 100 is based on the sound signal included in the content. In the present embodiment, the content includes position information and a sound signal related to a sound source.

As shown in FIG. 1, the speaker system 100 includes a personal computer (hereinafter referred to as a PC) 1, the first speaker 2, and the second speaker 3.

The PC 1 reproduces content selected by the user 7. The PC 1 transmits the sound signal included in the selected content to the first speaker 2 and the second speaker 3. Specifically, the PC 1 transmits the sound signal to the first speaker 2 by wireless communication. The PC 1 also transmits the sound signal to the second speaker 3 by wireless communication. The first speaker 2 and the second speaker 3 emit sound based on the received sound signal.

Further, the PC 1 moves the second speaker 3 based on position information of the sound source that is included in the content. In other words, the PC 1 causes the second speaker 3 to emit sound at a position of the sound source included in the content.

Here, as shown in FIG. 2, the direction in which the user 7 and the first speaker 2 are aligned is defined as the front-rear direction. Further, the direction from the user 7 to the first speaker 2 is the forward direction. Further, in the space 6, the direction toward the top of the page is defined as the upward direction, and the direction toward the bottom of the page is defined as the downward direction.

The first speaker 2 is positioned farther forward than the user 7 within the space 6. In other words, the first speaker 2 is a front speaker installed in the front. The first speaker 2 has speaker units corresponding to front channels (front L channel and front R channel) and to a center channel.

The second speaker 3 is a monaural speaker. The second speaker 3 has a moving body 4 moving based on information relating to position. The information relating to position corresponds to a position at which a sound source included in a second sound signal should be localized, and is generated based on a position to be localized that has changed with time, as described later. The second speaker 3 moves by the moving body 4. In the present embodiment, the moving body 4 of the second speaker 3 is, for example, a flying body such as a multicopter. That is, the second speaker 3 moves three-dimensionally within the space 6. The second speaker 3 of the present embodiment moves within the space 6 via remote control from the PC 1.

In the present embodiment, the content is in accordance with an object-(sound source-) based method. Content in accordance with the object-based method includes sound signal for each of a plurality of sound sources and information (position information) indicating the position of each of the plurality of sound sources.

The content includes position information and a sound signal corresponding to a first sound source. Further, the content includes location information and a sound signal corresponding to a second sound source. Here, the first sound source is a sound source whose localization does not change with time. The first sound source is, for example, ambient sound. Ambient sound can be, for example, the sounds of the hustle and bustle of a city, the sound of rainfall, etc. Further, the second sound source is a sound source whose localization changes with time. The second sound source is, for example, a sound effect. Further, the sound effect is, for example, a human voice, the sound of a vehicle, etc. The content includes a sound signal corresponding to the ambient sound and a sound signal corresponding to the sound effect.

Configuration of the PC 1

As shown in FIG. 3, the PC1 has a display unit 11, a user interface (I/F) 12, a flash memory 13, a RAM (Random Access Memory) 14, a communication unit 15, and an electronic controller (control unit) 16. The PC 1 is one example of an information processing device of this disclosure.

The display unit 11 displays various screens. For example, the display unit 11 displays content selection and a playback screen, or a display screen showing the position of the second speaker 3, etc. The display unit 11 includes a display such as an LCD and an LED, for example.

The user I/F 12 includes, for example, a keyboard and a mouse connected to the main body of the PC 1. The user I/F 12 receives an operation from the user 7. For example, the user I/F 12 receives a content selection operation from a content selection screen displayed on the display unit 11.

The communication unit 15 includes a wireless communication interface (I/F) that conforms to a standard, standards such as Wi-Fi (registered trademark) or Bluetooth (registered trademark). Further, the communication unit 15 includes a wired communication interface (I/F) that conforms to a standard, such as USB (Universal Serial Bus). The communication unit 15 is one example of a sound signal output unit of this disclosure.

The communication unit 15 transmits a sound signal to the first speaker 2 by wireless communication. Further, the communication unit 15 transmits a sound signal to the second speaker 3 by wireless communication. Further, the communication unit 15 transmits a control signal for remotely controlling the second speaker 3 to the second speaker 3.

The flash memory 13 stores the content. Further, the flash memory 13 stores a program relating to the operation of the second speaker 3.

The electronic controller 16 reads a program stored in the flash memory 13, which is a storage medium (storage device), into the RAM 14, to thereby realize various functions. The electronic controller 16 can include one or a plurality of processors and is configured from one or more types of processors, such as a CPU (Central Processing Unit), a GPU (Graphics Processing Unit), a DSP (Digital Signal Processor), an FPGA (Field Programmable Gate Array), an ASIC (Application Specific Integrated Circuit), and the like. Here, the term "electronic controller" as used herein refers to hardware, and does not include a human. Such various functions include, for example, a sound source extraction process, a localization process, and a control signal generation process. More specifically, as shown in FIG. 3, the electronic controller 16 includes a sound source extraction unit 161, a localization processing unit 162, and a control signal generation unit 163. By the program, the electronic controller 16 functions as the sound source extraction unit 161, the localization processing unit 162, and the control signal generation unit 163. The electronic controller 16 reads programs relating to the localization process and the control signal generation process into the RAM 14. The electronic controller 16 thereby constitutes the sound source extraction unit 161, the localization processing unit 162, and the control signal generation unit 163.

Further, the electronic controller 16 can download programs for executing the sound source extraction process, the localization process, and the control signal generation process from a server, for example. The electronic controller 16 can also constitute the sound source extraction unit 161, the localization processing unit 162, and the control signal generation unit 163 in this manner.

From the content stored in the flash memory 13, the sound source extraction unit 161 extracts the position information and the sound signal corresponding to the first sound source (ambient sound). In other words, the sound source extraction unit 161 searches for the sound source that is the first sound source. Further, from the content, the sound source extraction unit 161 extracts the position information and the sound signal corresponding to the second sound source (sound effect). In other words, the sound source extraction unit 161 searches for the sound source that is the second sound source. Here, the first sound source is the sound source (ambient sound) whose position does not change at a prescribed time. The second sound source is a sound source (sound effect) whose position, which is included in the position information, does change at a prescribed time. That is, when, at an arbitrarily set first time and second time, it is detected that the position of a sound source, which is included in the position information, has not changed, the sound source extraction unit 161 extracts that sound source as the sound signal and the position information that correspond to the first sound source. When, at the first time and the second time, it is detected that the position of the sound source, which is included in the position information, has changed, the sound source extraction unit 161 extracts that sound source as the sound signal and the position information that correspond to the second sound source.

The sound source extraction unit 161 transmits the sound signal corresponding to the second sound source (sound effect) as the second sound signal to the second speaker 3 via the communication unit 15.

The localization processing unit 162 generates the first sound signal based on the position information of the first sound signal extracted by the sound source extraction unit 161. More specifically, the localization processing unit 162 generates the first sound signal in accordance with the channel-based method based on the sound signal of the first sound source and the position information of the first sound source. The first sound signal includes sound signals corresponding to the front L channel (FL), the front R channel (FR), and the center channel (C). The localization processing unit 162 calculates the gain of the sound signal corresponding to each of the front L channel, the front R channel, and the center channel, such that the sound image of the first sound source is localized at a position corresponding to the position information of the first sound source. The localization processing unit 162 generates the first sound signal of three channels corresponding to the front L channel, the front R channel, and the center channel in accordance with the calculated gain, and transmits the first sound signal to the first speaker 2 via the communication unit 15.

The control signal generation unit 163 generates a control signal based on the position information of the second sound source. More specifically, the control signal generation unit 163 generates a control signal that indicates the coordinates, or the direction and amount of movement, calculated based on the position information of the second sound source. In this example, the coordinates indicate the distance of the sound source from a listening point that serves as the point of origin as well as the angle of the sound source. The control signal generation unit 163 calculates the coordinates of three orthogonal axes with the listening point as the point of origin, and generates a control signal to move a drone to the position of the second sound source. The control signal generation unit 163 transmits the control signal to the second speaker 3 via the communication unit 15.

In this manner, from one content, the PC 1 generates the first sound signal to be transmitted to the first speaker 2 and the second sound signal to be transmitted to the second speaker 3.

In the present embodiment, for example, once the PC 1 extracts a sound source as the sound signal and the position information of the second sound source, that sound source is treated as the second sound source until a prescribed condition is reached. The prescribed condition is, for example, a case in which the second sound source disappears. The disappearance of the sound source referred to here is a case in which the PC 1 detects that the sound of the second sound source has become silent or almost silent. In the case that the voice of a female main character is the second sound source and the sound signal and the position information of the sound source are extracted, the PC 1 extracts the sound signal and the position information of this female voice and transmits a control signal to the second speaker 3 until the female voice disappears. In this case, the second speaker 3 moves or hovers based on the control signal. Further, for example, if the second sound source disappears, the PC 1 again begins searching for a sound source to act as another second sound source.

Configuration of the First Speaker 2

The first speaker 2 emits sound from a speaker unit group 273 corresponding to the front L channel, the front R channel, and the center channel. As shown in FIG. 4, the first speaker 2 includes a display unit 21, a communication unit 22, a flash memory 23, a RAM (Random Access Memory) 24, an electronic controller (control unit) 25, a signal processing unit 26, and an output unit 27.

The display unit (display) 21 includes a plurality of LEDs (light-emitting diodes). The display unit 21 displays, for example, the ON/OFF state of the power source.

The communication unit 22 includes a wireless communication interface (I/F) that conforms to a standard, such as Wi-Fi (registered trademark) or Bluetooth (registered trademark). The communication unit 22 receives/acquires the first sound signal from the PC 1 by wireless communication. The first sound signal includes sound signals corresponding to the front L channel, the front R channel, and the center channel. The communication unit 22 is one example of the first sound signal input interface (first sound signal input unit) of this disclosure.

The electronic controller 25 reads a program stored in the flash memory 23, which is a storage medium (storage device), into the RAM 24, to thereby realize various functions. The electronic controller 25 can include one or a plurality of processors and is configured from one or more types of processors, such as a CPU (Central Processing Unit), a GPU (Graphics Processing Unit), a DSP (Digital Signal Processor), an FPGA (Field Programmable Gate Array), an ASIC (Application Specific Integrated Circuit), and the like. Here, the term "electronic controller" as used herein refers to hardware, and does not include a human. The electronic controller 25 inputs the first sound signal received via the communication unit 22 to the signal processing unit 26. In other words, the electronic controller 25 inputs sound signals corresponding to the front L channel, the front R channel, and the center channel to the signal processing unit 26.

The signal processing unit 26 includes one or a plurality of processors such as DSPs (Digital Signal Processors). The signal processing unit 26 subjects the first sound signal that is input to various types of signal processing. The signal processing unit 26 subjects the sound signals corresponding to the front L channel, the front R channel, and the center channel to signal processing such as equalizer processing.

The output unit 27 includes a D/A converter (DAC) 271, an amplifier (AMP) 272, and the speaker unit group 273. The D/A converter 271 converts the sound signals corresponding to the front L channel, the front R channel, and the center channel, which have been subjected to signal processing by the signal processing unit 26, into analog signals. The amplifier 272 amplifies the analog signals corresponding to the front L channel, the front R channel, and the center channel. The speaker unit group 273 has speaker units respectively corresponding to the front L channel, the front R channel, and the center channel. The speaker unit group 273 outputs the analog signals corresponding to the front L channel, the front R channel, and the center channel, which have been amplified by the amplifier 272, from the corresponding speaker units. The output unit 27 outputs sound (first sound) based on the first sound signal in a state in which a position of the host device (first speaker 2) is fixed. The output unit 27 is one example of the first sound emitter (first output unit) of this disclosure.

Configuration of the Second Speaker 3

The second speaker 3 moves three-dimensionally within the space 6, based on the control signal received from the PC 1. The second speaker 3 emits a sound (sound effect) based on the second sound signal.

As shown in FIG. 5, the second speaker 3 comprises the moving body 4 and a speaker device 5. The speaker device 5 is located on the moving body 4. The moving body 4 is controlled by remote control from the PC 1. The moving body 4 includes a wireless communication unit 41, a flash memory 42, a RAM (Random Access Memory) 43, an electronic controller (control unit) 44, a sensor unit 45, and a plurality of propeller units 46.

The wireless communication unit 41 acquires information relating to position and includes a wireless communication interface (I/F) that conforms to a standard, such as Wi-Fi (registered trademark) or Bluetooth (registered trademark). Further, the wireless communication unit 41 can be directly connected to a network. The wireless communication unit 41 receives a control signal transmitted from the PC 1. Further, the wireless communication unit 41 receives, for example, a GPS (Global Positioning System) signal via a network. The wireless communication unit 41 is one example of the position information acquisition interface (position information acquisition unit) of this disclosure.

The sensor unit 45 includes a gyro sensor that measures angular velocity, an acceleration sensor that measures acceleration, and an altitude sensor that measures altitude. Further, the sensor unit 45 can include a distance sensor, an azimuth sensor (compass), etc.

The electronic controller 44 reads a program stored in the flash memory 42, which is a storage medium (storage device), into the RAM 43, to thereby realize various functions. The electronic controller 44 can include one or a plurality of processors and is configured from one or more types of processors, such as a CPU (Central Processing Unit), a GPU (Graphics Processing Unit), a DSP (Digital Signal Processor), an FPGA (Field Programmable Gate Array), an ASIC (Application Specific Integrated Circuit), and the like. Here, the term "electronic controller" as used herein refers to hardware, and does not include a human. The electronic controller 44 moves the flying body based on the control signal received from the PC 1. In other words, the electronic controller 44 controls a plurality of propeller units 46 based on the received control signal.

Each of the plurality of propeller units 46 includes an ESC (Electric Speed Controller) 461, a motor 462, and a propeller 463. The ESC 461 is a circuit that drives the motor 462. The motor 462 rotates the propeller 463. The propeller 463 is feather-shaped to produce lift and propulsion. The propeller 463 is connected to the motor 462 and rotates.

The electronic controller 44 controls the rotation speed of each of the plurality of motors 462 which rotate the plurality of propellers 463 via the ESC 461. That is, the electronic controller 44 controls the ESC 461 based on the control signal. The electronic controller 44 carries out autonomous control, for example, by MD (Proportional-Integral-Differential) control. More specifically, the electronic controller 44 controls the rotation speed of each of the plurality of motors 462 such that the position of the host device (second speaker 3) moves to the position of the second sound source based on data of the sensor unit 45. In this manner, the electronic controller 44 moves the host device to the position (localization position) of the second sound source by flight, based on the data of the sensor unit 45 and the control signal received from the PC 1. The moving body 4 can thereby move in the desired direction.

The speaker device 5 includes a flash memory 51, a RAM (Random Access Memory) 52, an electronic controller (control unit) 53, a wireless communication unit 54, a signal processing unit 55, and an output unit 56.

The wireless communication unit 54 includes a wireless communication interface (I/F) that conforms to a standard, such as Wi-Fi (registered trademark) or Bluetooth (registered trademark). The wireless communication unit 54 receives/acquires the second sound signal transmitted by the PC 1. The second sound signal includes level information of the second sound signal. The wireless communication unit 54 is one example of the second sound signal input interface (second sound signal input unit) of this disclosure.

The electronic controller 53 reads a program stored in the flash memory 51, which is a storage medium (storage device), into the RAM 52 to thereby realize various functions. The electronic controller 53 can include one or a plurality of processors and is configured from one or more types of processors, such as a CPU (Central Processing Unit), a GPU (Graphics Processing Unit), a DSP (Digital Signal Processor), an FPGA (Field Programmable Gate Array), an ASIC (Application Specific Integrated Circuit), and the like. Here, the term "electronic controller" as used herein refers to hardware, and does not include a human. The electronic controller 53 inputs the second sound signal received by the wireless communication unit 54 to the signal processing unit 55.

The signal processing unit 55 includes one or a plurality of processors such as DSPs (Digital Signal Processors). The signal processing unit 55 subjects the second sound signal that is input based on the level information of the second sound source to various types of signal processing. The signal processing unit 55 subjects the second sound signal to signal processing, such as equalizer processing.

The output unit 56 outputs sound (second sound) based on the second sound signal and includes a D/A converter (DAC) 561, an amplifier (AMP) 562, and a speaker unit 563. The DA converter 561 converts the sound signal subjected to signal processing by the signal processing unit 55 into an analog signal. The amplifier 562 amplifies the analog signal converted by the D/A converter 561. The speaker unit 563 outputs the analog signal amplified by the amplifier 562. The output unit 56 is one example of the second sound emitter (second output unit) of this disclosure.

Movement Control Process of the Speaker System 100

Figure 6:
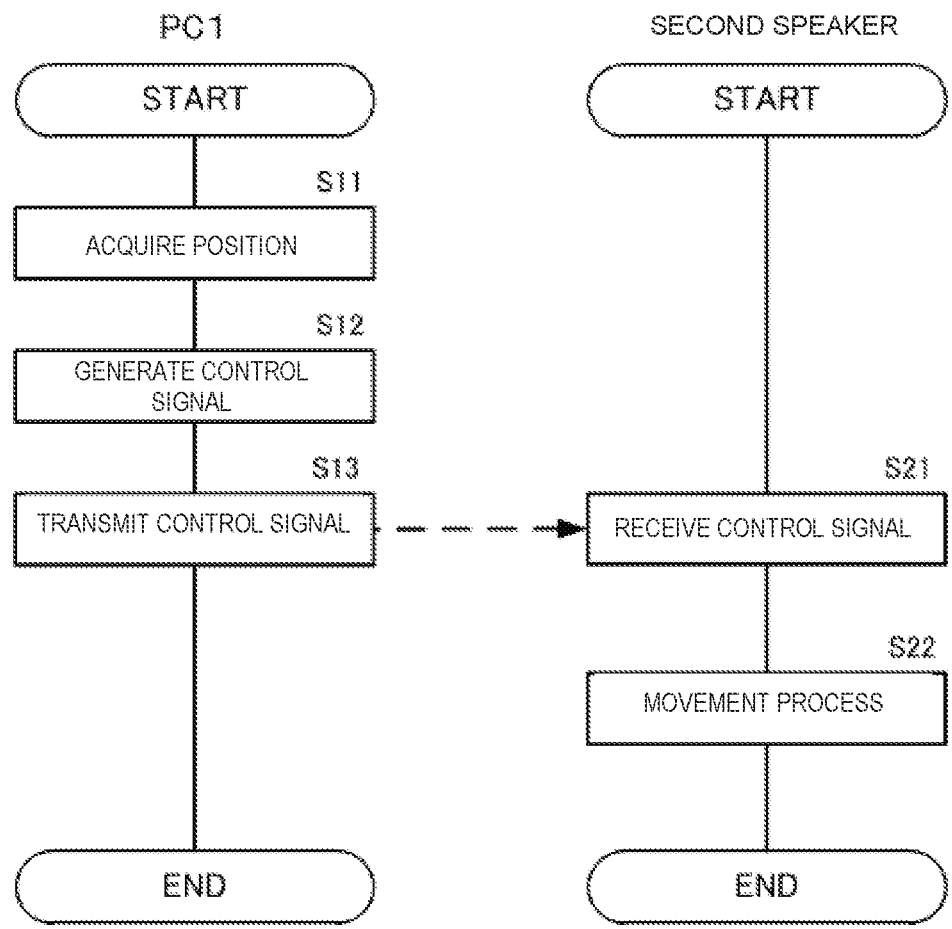
FIG. 6 is a flowchart showing one example of the movement control process of the speaker system.

The movement control process of the speaker system 100 will be described with reference to FIG. 6. FIG. 6 is a flowchart showing one example of the movement control process of the speaker system 100. In the speaker system 100, the second speaker 3 is moved to the position of the second sound source based on the control signal received from the PC 1. The position (localization position) of the second sound source is based on the position information of the second sound source extracted by the sound source extraction unit 161.

The PC 1 acquires the position information of the second sound source (S11). In this case, the display unit 11 can display the current position of the second speaker 3, for example. Further, the display unit 11 can display the position of the second sound source, for example. Further, the display unit 11 can display the listening point, for example. The user 7 can in this way confirm the listening point, the current position of the second speaker 3, and the position of the sound source on the display unit 11. The PC 1 generates the control signal based on the position information of the second sound source (S12). The PC 1 transmits the generated control signal to the second speaker 3 (S13).

The second speaker 3 receives the control signal transmitted from the PC 1 (S21). The second speaker 3 moves to the position of the second sound source based on the received control signal (S22).

Sound Emission Process of the Speaker System 100

Figure 7:
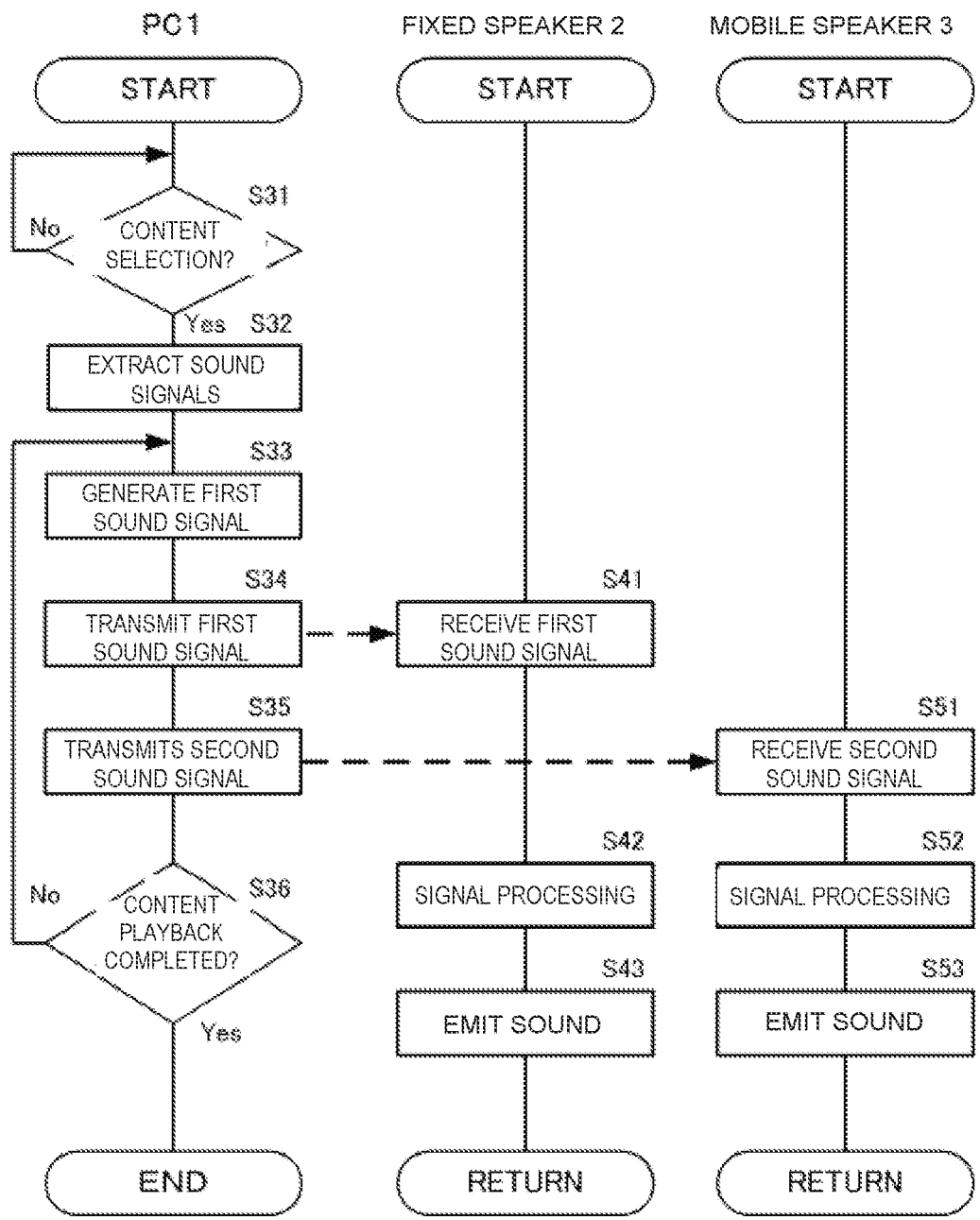
FIG. 7 is a flowchart showing one example of the sound emission process of the speaker system.

The sound emission process work of the speaker system 100 will be described with reference to FIG. 7. FIG. 7 is a flowchart showing one example of the sound emission process of the speaker system 100.

When content is selected (S31: Yes), the PC 1 extracts the sound signal (second sound signal) corresponding to the second sound source (sound effect) and the sound signal related to the first sound source (ambient sound) (S32). The PC 1 generates the first sound signal based on the position information of the first sound source (S33). The PC 1 transmits the first sound signal to the first speaker 2 (S34). At the same time, the PC1 transmits the second sound signal to the second speaker 3 (S35). The PC 1 transmits the first sound signal and the second sound signal to the first speaker 2 and the second speaker 3, respectively, until the playback of the content ends (S36: No).

The first speaker 2 receives the first sound signal including sound signals corresponding to the front L channel, the front R channel, and the center channel (S41). The first speaker 2 applies signal processing to the first sound signal as appropriate (S42). More specifically, the first speaker 2 applies suitable signal processing to the sound signals respectively corresponding to the front L channel, the front R channel, and the center channel. The first speaker 2 converts each of the signal-processed sound signals into analog signals and outputs them (S43).

The second speaker 3 receives the second sound signal (S51). The second speaker 3 subjects the second sound signal to suitable signal processing (S52). The second speaker 3 converts each of the signal-processed sound signals into analog signals and outputs them (S53).

The second speaker 3 can thus output a sound effect while changing the position of the second sound source, thereby reproducing, instead of a virtual sound image, a sound source that actually moves.

As described above, in the speaker system 100, the first speaker 2 emits sound based on the first sound signal including sound signals respectively corresponding to the front L channel, the front R channel, and the center channel, received from the PC 1. Further, the second speaker 3 receives the second sound signal generated by the PC 1 and emits sound based on the received second sound signal. Further, the second speaker 3 moves three-dimensionally based on the control signal received from the PC 1. In the speaker system 100 of the present embodiment, the movement control process and the sound emission process are carried out simultaneously; the second speaker 3 can thereby emit sound while moving.

Based on the position information of the first sound source, the first speaker 2 emits sound such that the sound image of the first sound source is localized at the position specified in the position information. Further, the second speaker 3 emits sound at the position of the second sound source specified in the position information. The speaker system 100 thereby improves the surround quality. In this way, the speaker system 100 can impart to the listener a sense of presence.

Further, in the speaker system 100 of the first embodiment, the first sound signal and the second sound signal are sound signals extracted from the same content. For example, the user 7 can be watching scene from a movie scene in which a helicopter is flying through the sky in the rain. In the speaker system 100 of the first embodiment, the ambient sound that is included in the movie content, such as the sound of the rain, is emitted from the first speaker 2. Further, the second sound source (sound effect) included in the content, such as the sound of the helicopter, is emitted from the second speaker 3. In this case, the position of the second sound source (sound of the helicopter) can be, for example, on the right rear side of the user 7 and above the head of the user 7. The speaker system 100 moves the second speaker 3 so that it is located on the right rear side of the user 7 and above the head of the user 7. Further, the PC 1 moves the second speaker 3 as the helicopter moves. If the position information corresponding to the second sound source is changed from the right rear side to the left rear side of the user 7, the PC 1 generates a control signal such that the sound source of the helicopter is moved from the right rear side to the left rear side of the user 7 and transmits the control signal to the second speaker 3. In this manner, in the speaker system 100 of the first embodiment, while moving, the second speaker 3 emits sound that matches the content of the video. The user 7 can thereby feel more immersed experience in the content.

Second Embodiment

Figure 8:
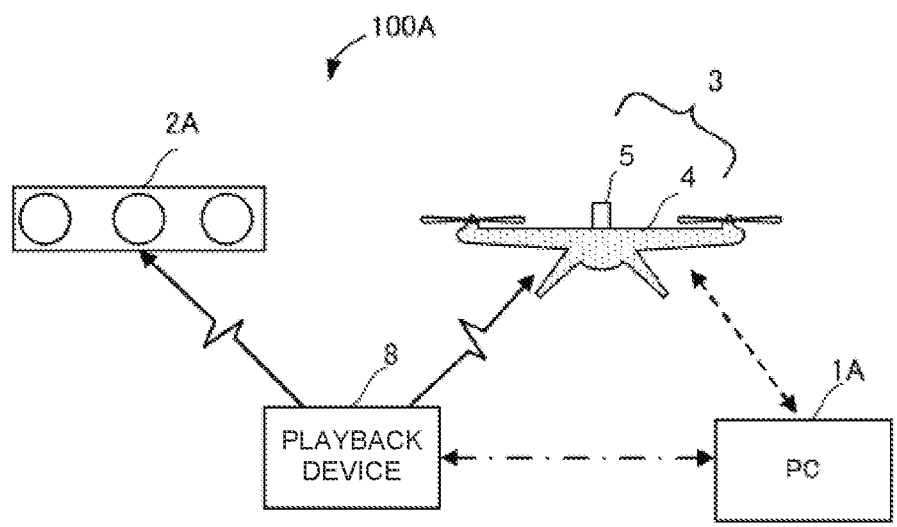
FIG. 8 is a configuration diagram showing one example of the configuration of a speaker system according to a second embodiment.
Figure 9:
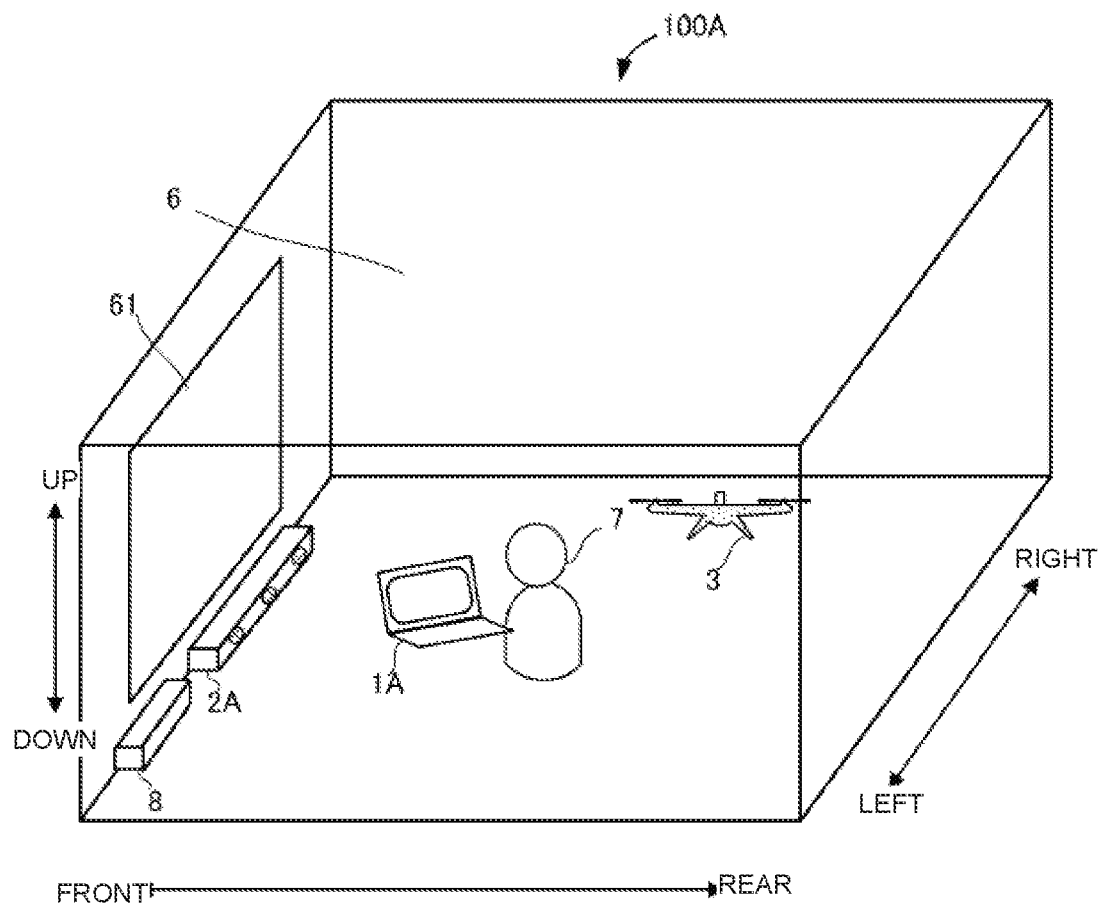
FIG. 9 is an explanatory diagram showing one example of the space in which the speaker system of the second embodiment is used.
Figure 10:
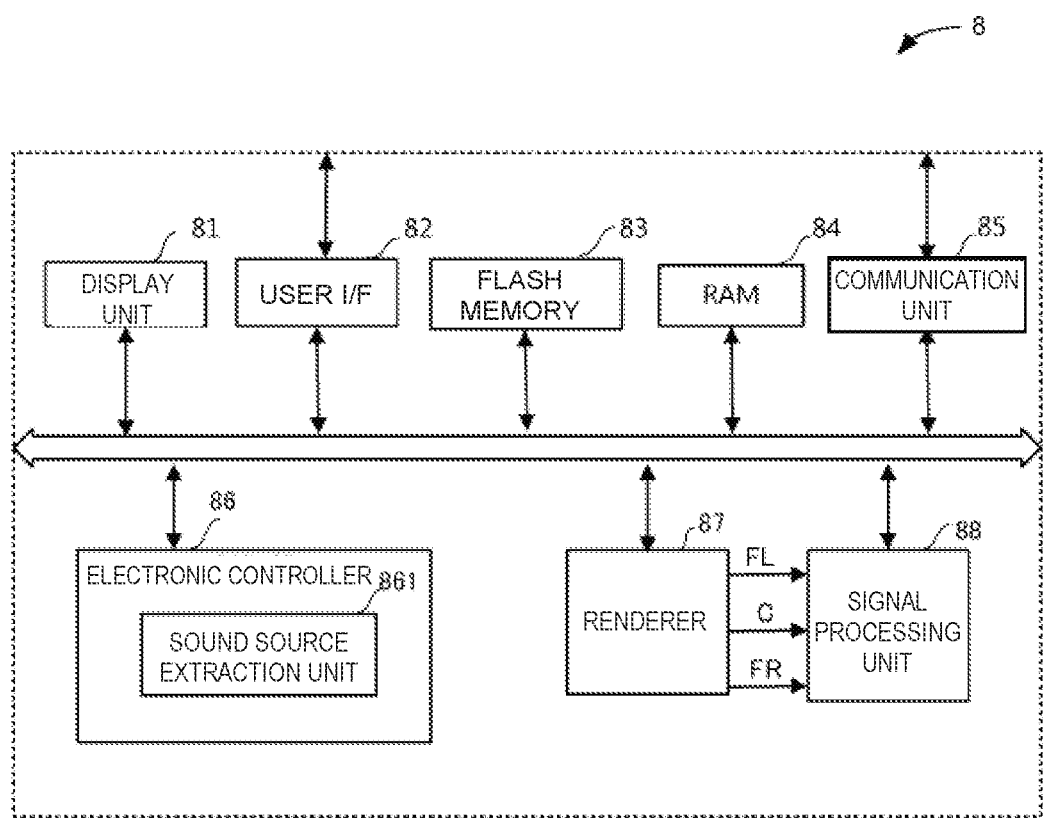
FIG. 10 is a block configuration diagram showing one example of the configuration of a playback device of the second embodiment.

A speaker system 100A according to the second embodiment will be described with reference to FIGS. 8, 9, and 10. FIG. 8 is a configuration diagram showing one example of the speaker system 100A. FIG. 9 is an explanatory diagram showing one example of the space 6 in which the speaker system 100A is used. FIG. 10 is a block configuration diagram showing one example of a configuration of a playback device 8. Configurations that are the same as those of the embodiment described above have been assigned the same reference symbols, and their descriptions have been omitted. Further, in this example, the content includes video and audio, in accordance with the object-based method.

As shown in FIG. 8, the speaker system 100A of the second embodiment further comprises the playback device 8. The playback device 8 executes some of the above-described processes of the PC 1 in place of the PC 1.

The playback device 8 is, for example, a playback device that plays a DVD or a Blu-ray disc. Alternatively, the playback device 8 is a playback device that reproduces content received via the Internet. The playback device 8 transmits, for example, a video signal to a television 61 by wired communication. As shown in FIG. 9, the playback device 8 is located below the television 61 and next to the first speaker 2, for example.

As shown in FIG. 8, the playback device 8 has a display unit 81, a user interface (I/F) 82, a flash memory 83, a RAM (Random Access Memory) 84, a communication unit 85, an electronic controller (control unit) 86, a renderer 87, and a signal processing unit 88. The playback device 8 is one example of an information processing device of this disclosure.

The display unit (display) 81 includes a plurality of LEDs (light-emitting diodes). The display unit 81 displays, for example, the ON/OFF state of the power source. The display unit 81 displays play/stop.

The user I/F 82 receives the operation of power on/off for example. Further, the user I/F 82 receives the operation of play/stop.

The communication unit 85 includes a wireless communication interface (I/F) that conforms to a standard, such as Wi-Fi (registered trademark) or Bluetooth (registered trademark). Further, the communication unit 85 includes a wired communication interface (I/F) that conforms to a standard, such as USB (Universal Serial Bus). The communication unit 85 is one example of the sound signal output unit of this disclosure.

The communication unit 85 transmits the first sound signal to the first speaker 2 by wireless communication. Further, the communication unit 85 transmits the second sound signal to the second speaker 3. Further, the communication unit 85 transmits the position information that indicates the position (localization position) of the second sound source to the PC 1A.

The electronic controller 86 reads a program stored in the flash memory 83, which is a storage medium (storage device), into the RAM 84, to thereby carry out a sound source extraction process, for example. The electronic controller 86 can include one or a plurality of processors and is configured from one or more types of processors, such as a CPU (Central Processing Unit), a GPU (Graphics Processing Unit), a DSP (Digital Signal Processor), an FPGA (Field Programmable Gate Array), an ASIC (Application Specific Integrated Circuit), and the like, Here, the term "electronic controller" as used herein refers to hardware, and does not include a human. More specifically, the electronic controller 86 includes a sound source extraction unit 861. The electronic controller 86 functionally comprises the sound source extraction unit 861 by the program. The electronic controller 86 reads a program related to the sound source extraction process into the RAM 84. The electronic controller 86 thereby constitutes the sound source extraction unit 861.

The sound source extraction unit 861 carries out the same process as the sound source extraction unit 161 of the first embodiment, i.e., to extract from the content stored in the flash memory 83 the position information and the sound signals respectively corresponding to the first sound source and the second sound source. A detailed description of the sound source extraction unit 861 will therefore be omitted.

The sound source extraction unit 861 outputs the extracted sound signal corresponding to the first sound source to the renderer 87. The sound source extraction unit 861 transmits the sound signal of the second sound source to the second speaker 3 via the communication unit 85 as the second sound signal.

The renderer 87 includes one or a plurality of processors such as DSPs (Digital Signal Processors). The renderer 87 generates the first sound signal in accordance with the channel-based method based on the position information of the first sound source. The first sound signal includes sound signals corresponding to the front L channel (FL), the front R channel (FR), and the center channel (C). The renderer 87 calculates the gain of the sound signal corresponding to each of the front L channel, the front R channel, and the center channel, such that the sound image of the first sound source is localized at a position corresponding to the position information of the first sound source. In accordance with the calculated gain, the renderer 87 generates sound signals corresponding to the front L channel, the front R channel, and the center channel. The renderer 87 outputs sound signals respectively corresponding to each of the front L channel, the front R channel, and the center channel to the signal processing unit 88.

The signal processing unit 88 includes one or a plurality of processors such as DSPs (Digital Signal Processors). The signal processing unit 88 subjects the sound signals of the front L channel, the front R channel, and the center channel, input in accordance with a setting of the electronic controller 86, to prescribed signal processing, such as equalizer processing. The signal processing unit 88 transmits the first sound signal to the first speaker 2 via the communication unit 85.

The control signal generation unit 163 of the PC 1A generates a control signal based on the position information corresponding to the second sound source, which was transmitted from the playback device 8. The control signal generation unit 163 transmits the generated control signal to the second speaker 3 via the communication unit 85.

In this manner, in the speaker system 100A of the second embodiment, the playback device 8 transmits the sound signal corresponding to the second sound source to the second speaker 3. Further, the PC 1A generates the control signal corresponding to the second sound source and transmits the control signal to the second speaker 3. In this manner, the speaker system 100A of the second embodiment can reduce the load on the PC 1A, as compared with the PC 1 of the first embodiment. Therefore, in the speaker system 100A of the second embodiment, a drone controller, a terminal lacking high specifications, or the like, can be used as PC 1A.

Third Embodiment

Figure 11:
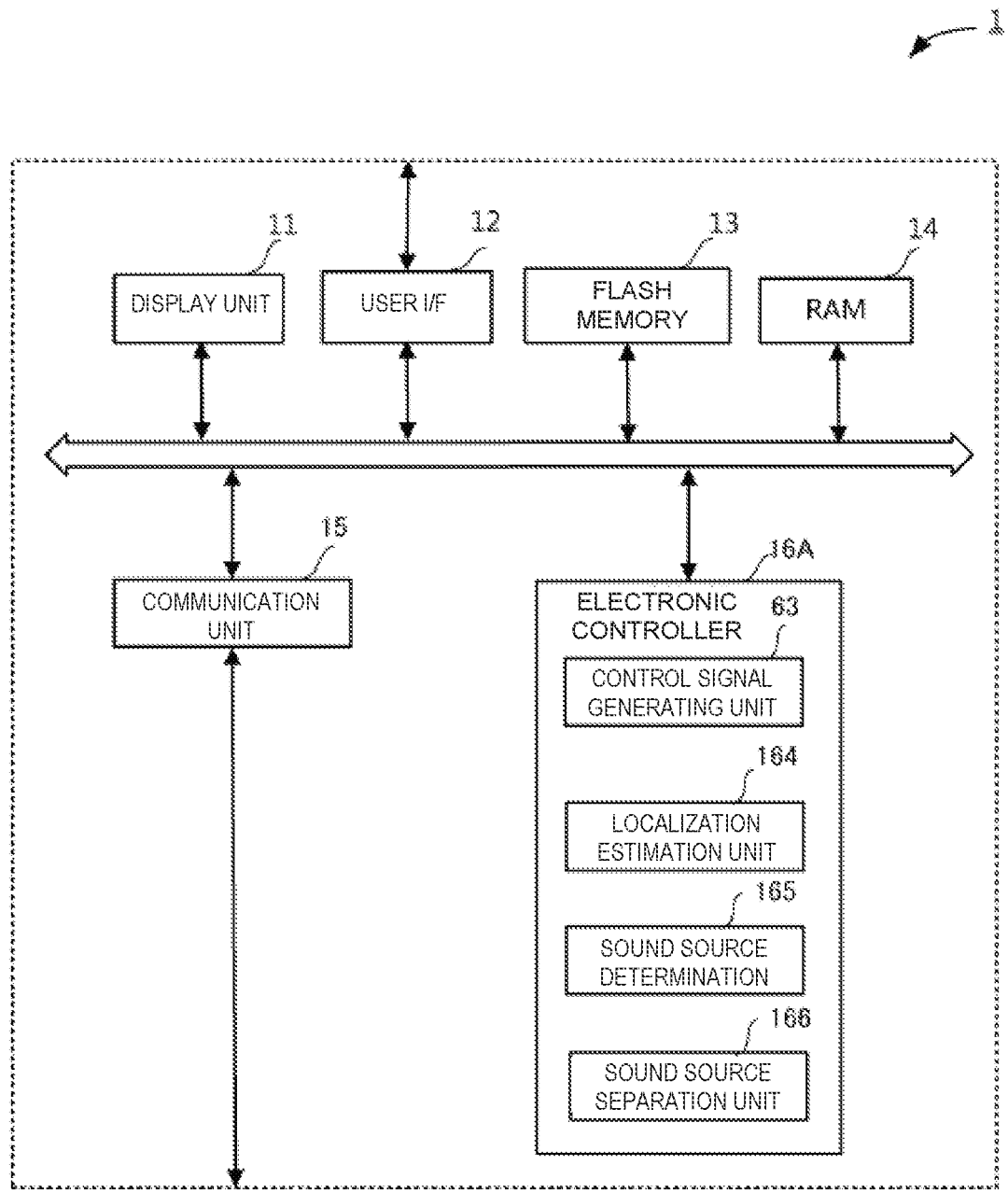
FIG. 11 is a block configuration diagram showing one example of the configuration of a PC according to a third embodiment.

The speaker system 100 of the third embodiment differs from that of the first embodiment in being able to select and reproduce content in accordance with the channel-based method of 5.1 channels (front L, front R, center, rear L, rear R, and subwoofer). The speaker system 100 according to the third embodiment will be described with reference to FIG. 11. FIG. 11 is a block configuration diagram showing one example of the configuration of PC 1 according to the third embodiment. Configurations that are the same as those of the first embodiment described above have been assigned the same reference symbols, and their descriptions have been omitted.

An electronic controller (control unit) 16A reads a program stored in the flash memory 13, which is a storage medium (storage device), into the RAM 14, thereby realizing various functions. The electronic controller 16A can include one or a plurality of processors and is configured from one or more types of processors, such as a CPU (Central Processing Unit), a GPU (Graphics Processing Unit), a DSP (Digital Signal Processor), an FPGA (Field Programmable Gate Array), an ASIC (Application Specific Integrated Circuit), and the like. Here, the term "electronic controller" as used herein refers to hardware, and does not include a human. Such various functions include, for example, a localization estimation process, a sound source determination process, and a sound source separation process. As shown in FIG. 11, the electronic controller 16A includes the control signal generation unit 163, a localization estimation unit 164, a sound source determination unit 165, and a sound source separation unit 166. The electronic controller 16A functionally comprises the control signal generation unit 163, the localization estimation unit 164, the sound source determination unit 165, and the sound source separation unit 166, by the program. The electronic controller 16A reads programs related to the control signal generation process, the localization estimation process, the sound source determination process, and the sound source separation process, into the RAM 14. The electronic controller 16A thereby constitutes the control signal generation unit 163, the localization estimation unit 164, the sound source determination unit 165, and the sound source separation unit 166.

Further, the electronic controller 16A can download from a server, for example, an application program that executes the control signal generation process, the localization estimation process, the sound source determination process, and the sound source extraction process. The electronic controller 16A thereby constitutes the localization estimation unit 164, the sound source determination unit 165, and the sound source separation unit 166.

The electronic controller 16A extracts the sound signal and position information corresponding to the sound source included in the content by the localization estimation unit 164, the sound source determination unit 165, and the sound source separation unit 166.

The electronic controller 16A generates the first sound signal of the three channels corresponding to the front L channel, the front R channel, and the center channel and transmits the first sound signal to the first speaker 2 via the communication unit 15.

The localization estimation unit 164 estimates a localization position of the second sound source. The communication unit 15 transmits the estimated localization position to the second speaker 3 as the information relating to position.

More specifically, the localization estimation unit 164 analyzes the sound signals corresponding to the front L channel, the front R channel, the center channel, the rear L channel, the rear R channel, and the subwoofer. The localization estimation unit 164 respectively calculates the cross-correlations of the sound signals respectively corresponding to the front L channel, the front R channel, the center channel, the rear L channel, the rear R channel, and the subwoofer that are input. For example, if the correlation value of the sound signals corresponding to a plurality of channels (for example, the front L channel, the front R channel, the rear L channel, and the rear R channel) is high, the localization estimation unit 164 estimates the position of the sound source from the volume levels of these sound signals. In this case, the positions of the speakers corresponding to the front L channel, the front R channel, the center channel, the rear L channel, the rear R channel, and the subwoofer in the space 6 are stored in the flash memory 13 in advance. The localization estimation unit 164 estimates the position of the sound source from the positions of the speakers of the front L channel, the front R channel, the center channel, the rear L channel, the rear R channel, and the subwoofer and the volume level ratio of each channel.

For example, if the correlation value of the sound signals corresponding to the front L channel, the front R channel, the rear L channel, and the rear R channel is high, the volume levels of the sound signals respectively corresponding to the front L channel, the front R channel, the rear L channel, and the rear R channel are detected. For example, the volume level of the sound signal corresponding to each channel is divided into 10 relative stages (1-10). The volume of volume level 1 is lowest, and the volume of volume level 10 is highest. In this case, the distance from the position corresponding to the speaker of each channel to the sound source increases as the volume level decreases. Further, the distance from the position corresponding to the speaker of each channel to the sound source decreases as the volume level increases. In this example, the distance between each speaker and the sound source is divided into 10 relative stages in accordance with the volume level. That is, when the volume level is 1, the distance is 10. And when the volume level is 10, the distance is 1.

A more specific explanation will be given. If the volume level corresponding to the front L channel is 1, the distance r1 is 10. If the volume level corresponding to the front R channel is 6, the distance r2 is 5. And if the volume level of the rear R channel is 10, the distance r3 is 1. If these distances r1, r2, and r3 are represented as radii of circles (fan shape), the localization estimation unit 164 estimates that the part where the circles (fan shapes) overlap is the location of sound source Ao1. The localization estimation unit 164 can estimate the location of the sound source by detecting the volume levels corresponding to at least three channels. However, the localization estimation unit 164 can also detect the volume levels of four or more channels in order to estimate the position of the sound source more accurately. In this case, the localization estimation unit 164 can estimate the location of the sound source more accurately by detecting the volume level of the rear L channel.

The sound source determination unit 165 determines whether the sound source estimated by the localization estimation unit 164 is a sound source whose localization changes with time. If the estimated position of the sound source changes between first and second arbitrarily determined times, the sound source determination unit 165 determines that the sound source is the second sound source. Further, if the estimated position of the sound source does not change between the first time and the second time, the sound source determination unit 165 determines that the sound source is not the second sound source.

The sound source separation unit 166 separates the estimated sound source (second sound source) from the plurality of sound sources included in the content. For example, from among the sound signals corresponding to the front L channel, the front R channel, the rear L channel, and the rear R channel with a high correlation value, the sound source separation unit 166 extracts the sound signal of the channel with the highest level as the sound signal of the second sound source. In this example, the volume level of the sound signal of the rear R channel is highest. Therefore, the sound source separation unit 166 extracts the sound signal of the rear R channel as the sound signal of the second sound source. Alternatively, the sound source separation unit 166 can utilize spectral subtraction, for example, and remove sounds other than the second sound source from the sound signal of the rear R channel in order to extract the second sound source. Further, the sound source separation unit 166 can use, for example, a Wiener filter to remove sounds other than the second sound source from the sound signal of the rear R channel.

Further, the sound source separation unit 166 can employ adaptive beam forming in order to separate the second sound source from the plurality of sound sources. The sound source separation unit 166 can carry out delay-sum processing in relation to the sound signals corresponding to channels with a high correlation value, for example, the front L channel, the front R channel, the rear L channel, and the rear R channel, thereby emphasizing the sound of the second sound source. In this case, the sound source separation unit 166 carries out the delay process for each sound signal in accordance with the distance from the position of the speaker of each of the front L channel, the front R channel, the rear L channel, and the rear R channel to the second sound source as estimated by the localization estimation unit 164

The sound source separation unit 166 transmits the sound signal of the second sound source to the second speaker 3 via the communication unit 15.

The control signal generation unit 163 generates the control signal from information based on the position of the sound source determined to be the second sound source. The control signal generation unit 163 transmits the control signal to the second speaker 3 via the communication unit 15. In this case, the second speaker 3 moves to the position of the second sound source based on the transmitted control signal.

The speaker system 100 of the third embodiment extracts the first sound signal and the second sound signal from the channel-based content. Further, the speaker system 100 of the third embodiment estimates (determines) the position of the second sound source. The first speaker 2 outputs sound based on the first sound signal. Further, the second speaker 3 outputs sound based on the second sound signal at the position of the second sound source based on the control signal received from the PC 1. In this manner, in the speaker system 100 of the third embodiment, sound based on the second sound signal received by the second speaker 3 is emitted at the position of the second sound source, thereby improving the surround quality, Consequently, the speaker system 100 can impart a sense of presence to the listener.

Further, the second speaker 3 emits sound while moving in accordance with the control signal. In this manner, the speaker system 100 of the third embodiment can emit from the second speaker 3 the sound of a sound effect that matches the video. The user 7 can thereby feel more immersed in the content.

Further, in the speaker system 100 of the third embodiment, the process of extracting the sound source can be carried out by another device, such as the playback device. In this case, when the estimated sound source is determined to be the second sound source, the other device transmits the position information of the second sound source to the PC 1. The PC 1 generates the control signal based on the received position information. Thus, in the speaker system 100 of the third embodiment, if the other device estimates the sound source, the processing load on PC 1 can be reduced. Therefore, in the speaker system 100 of the third embodiment, the controller of a multicopter, a terminal lacking high specifications, etc., can be used as PC 1.

The sound source separation unit 166 can extract the sound signal with the maximum level during the time of day with a high correlation value as the sound signal of the second sound source. The sound source separation unit 166 can also utilize beam-forming to extract the sound source.

Other Embodiments

The second speaker 3 can further include a camera, create a map based on surrounding information acquired by the camera and movement information of the host device (second speaker 3), and use SLAM (Simultaneous Localization and Mapping), which estimates the position of the host device. Further, the second speaker 3 can calculate the three-point positioning based on the arrival time and the radio wave intensity of radio waves acquired from each of a plurality of Wi-Fi (registered trademark) access points in order to estimate the position of the host device. Further, the second speaker 3 can measure the signal strength of BLE (Blue Tooth (registered trademark) Low Energy) from a beacon transmitter installed in the space 6 in order to estimate the position of the host device. Further, the second speaker 3 can be equipped with an RFID (Radio Frequency Identifier) tag, and acquire information read from a reader in order to estimate the position of the host device. Further, DR (Dead Reckoning) technology employing speed sensors, magnetic sensors, etc., can be used to estimate the position of the host device. Further, the second speaker 3 can use an IMES (Indoor Message System) transmitter in order to estimate position. In this case, the second speaker 3 receives information transmitted from the IMES transmitter to estimate the position of the host device. Further, the second speaker 3 can receive ultrasonic waves output from a speaker (for example, the first speaker 2) to estimate the position of the host device. Further, the second speaker 3 can use UWB (Ultra Wide Band) to estimate the position of the host device. In this case, the second speaker 3 is equipped with a tag, detects radio waves transmitted from the tag by a sensor, and receives the detected information in order to estimate the position of the host device. Further, the second speaker 3 can use visible light communication technology in order to estimate the position of the host device. In this case, the second speaker 3 receives high-speed flashing patterns including the position information of the host device made by an illumination element, such as an LED, with a camera or an image sensor in order to estimate the position of the host device.

In the first, second, and third embodiments described above, an example of the second speaker 3 is described in which the moving body 4 is a flying body, but no limitations are imposed. The moving body 4 of the second speaker 3 can be, for example, a vehicle body that runs on a floor. Further, the moving body 4 of the second speaker 3 can be attached to a pole provided vertically on a floor of the space 6 and can move up and down, for example. The moving body 4 of the second speaker 3 can, for example, move while being suspended from a wire provided in the space 6.

In the first, second, and third embodiments described above, an example is described in which the first speaker 2 is a front speaker in the speaker systems 100, 100A, but no limitations are imposed thereby. The speaker systems 100, 100A can include a first speaker corresponding to a plurality of surrounds, such as 5.1 channel.

In the first, second, and third embodiments described above, an example is described in which there is one second speaker 3, but no limitations are imposed thereby. The speaker systems 100, 100A can have a plurality of second speakers 3.

In the first, second, and third embodiments described above, the PC 1 of the speaker systems 100, 100A can utilize AI (Artificial Intelligence) to extract sound source information (sound signal and position information). The AI analyzes and learns a plurality of sound sources in advance in order to identify the type of the sound source from among the plurality of sound sources included in the content and extract the sound signal and position information corresponding to the sound source. The AI suitably determines the first sound source and the second sound source from the plurality of sound sources included in the content in accordance with the type of sound source. More specifically, the AI determines sound source types such as the sound of rain, the noise of a crowd, or the like, as the first sound source. Further, the AI determines sound source types such as the human voice, the sound of a helicopter, or the like, as the second sound source.

Further, the AI extracts the second sound signal and the position information corresponding to the second sound source. For example, the AI determines, from among the plurality of sound sources included in the content, the sound of a helicopter as the second sound source. In this case, the AI further extracts the sound signal and the position information of the sound of a helicopter. That is, the PC 1 can extract a sound signal and position information more accurately related to the sound of a helicopter. Therefore, while moving, the speaker systems 100, 100A can emit only the type of sound desired by the user (in this example, the sound of a helicopter).

The speaker systems 100, 100A can use a server that has AI. In this case, the PC 1 can transmit the sound signal of the content to the server, and acquire from the server the second sound signal and the position information corresponding to the second sound source.

Further, the user I/F 12 can have a touch panel overlaid on the display unit 11. The user 7 can use the touch panel to select and reproduce the content or control the second speaker 3.

Further, in the first, second, and third embodiments described above, an example is described in which the second speaker 3 automatically moves to the position of the second sound source in the speaker systems 100, 100A, but no limitations are imposed thereby. Some or all of the movement of the second speaker 3 can be controlled by the user 7, In this case, the user I/F 12 of the PC 1 receives an operation to control the second speaker 3. The control operation is an operation for moving the second speaker 3 back and forth, up and down, and left and right. Control operations include a hovering operation for continued suspension over a particular location, as well as a landing operation for landing on the floor. For example, the user 7 moves the second speaker 3 to the position of the second sound source displayed on the display unit 11. The control signal generation unit 163 generates the control signal based on the control operation at prescribed time intervals, until the second speaker 3 moves to the position of the second sound source. The control signal generation unit 163 transmits the generated control signal to the second speaker 3 via the communication unit 15. The control by the user 7 includes making emergency stops, for example.

According to this disclosure, it is possible to impart a sense of presence to the listener.

Finally, the description of the present embodiment serves merely as an example in all respects and should not be considered restrictive. The scope of the present invention is indicated by the Claims section, and not by the embodiment described above. Furthermore, the scope of the present invention includes the scope that is equivalent that of the Claims.

What is claimed is:

1. A speaker system comprising:
    a first speaker including
        a first sound signal input interface configured to acquire a first sound signal, and
        a first sound emitter configured to output a first sound based on the first sound signal in a state in which a position of a host device is fixed; and
    a second speaker including
        a second sound signal input interface configured to acquire a second sound signal,
        a moving body that includes a position information acquisition interface configured to acquire information relating to position, the moving body being configured to move based on the information relating to position, and
        a second sound emitter configured to output a second sound based on the second sound signal.

2. The speaker system according to claim 1, wherein
    the information relating to position corresponds to a position at which a sound source included in the second sound signal is localized.

3. The speaker system according to claim 2, wherein
    localization of the sound source included in the second sound signal changes with time, and
    the information relating to position is generated based on a position to be localized that has changed with time.

4. The speaker system according to claim 1, further comprising
    an information processing device including an electronic controller having at least one processor, the electronic controller being configured to execute a plurality of units including
        a sound source extraction unit configured to extract from content the first sound signal corresponding to a first sound source whose localization does not change with time, and the second sound signal corresponding to a second sound source whose localization changes with time, and
        a sound signal output unit configured to output the first sound signal to the first speaker and outputs the second sound signal to the second speaker.

5. The speaker system according to claim 4, wherein
    the electronic controller is further configured to execute a localization estimation unit configured to estimate a localization position of the second sound source, and
    the sound signal output unit is configured to transmit the localization position that is estimated to the second speaker as the information relating to position.

6. The speaker system according to claim 1, wherein
    the first sound signal and the second sound signal are sound signals extracted from same content, and
    the first sound signal is different from the second sound signal.

7. The speaker system according to claim 1, wherein
    the second speaker is configured to output the second sound from the second sound emitter while moving.

8. The speaker system according to claim 1, wherein
    the moving body is a flying body.

9. The speaker system according to claim 1, wherein
    the first speaker is a front speaker, and
    the second speaker is a monaural speaker.

10. A sound output method comprising:
    acquiring a first sound signal by a first speaker;
    outputting, by the first speaker, a first sound based on the first sound signal in a state in which a position of the first speaker is fixed;
    acquiring a second sound signal by a second speaker;
    acquiring information relating to position by the second speaker;
    moving a moving body of the second speaker based on the information relating to position by the second speaker; and
    outputting a second sound based on the second sound signal by the second speaker.

11. The sound output method according to claim 10, wherein
    the information relating to position corresponds to a position at which a sound source included in the second sound signal is localized.

12. The sound output method according to claim 11, wherein
    localization of the sound source included in the second sound signal changes with time, and
    the information relating to position is generated based on a position to be localized that has changed with time.

13. The sound output method according to claim 10, further comprising
    extracting, by an information processing device, from content the first sound signal corresponding to a first sound source whose localization does not change with time, and the second sound signal corresponding to a second sound source whose localization changes with time, outputting the first sound signal to the first speaker by the information processing device, and outputting the second sound signal to the second speaker by the information processing device.

14. The sound output method according to claim 13, further comprising estimating a localization position of the second sound source by the information processing device, and transmitting the localization position that is estimated to the second speaker as information relating to position by the information processing device.

15. The sound output method according to claim 10, wherein the first sound signal and the second sound signal are sound signals extracted from same content, and the first sound signal is different from the second sound signal.

16. The sound output method according to claim 10, wherein the outputting of the second sound is performed while the moving of the moving body is performed at the second speaker.

17. The sound output method according to claim 10, wherein the moving body is a flying body.

18. The sound output method according to claim 10, wherein the first speaker is a front speaker, and the second speaker is a monaural speaker.

* * * * *